Dec. 20, 1955  C. F. SARDOU, JR  2,727,796
TEMPERATURE COMPENSATION OF SHAFT END PLAY AND THE LIKE
Filed Jan. 11, 1955
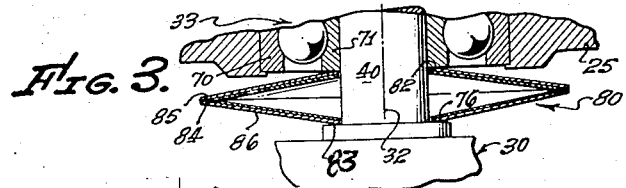
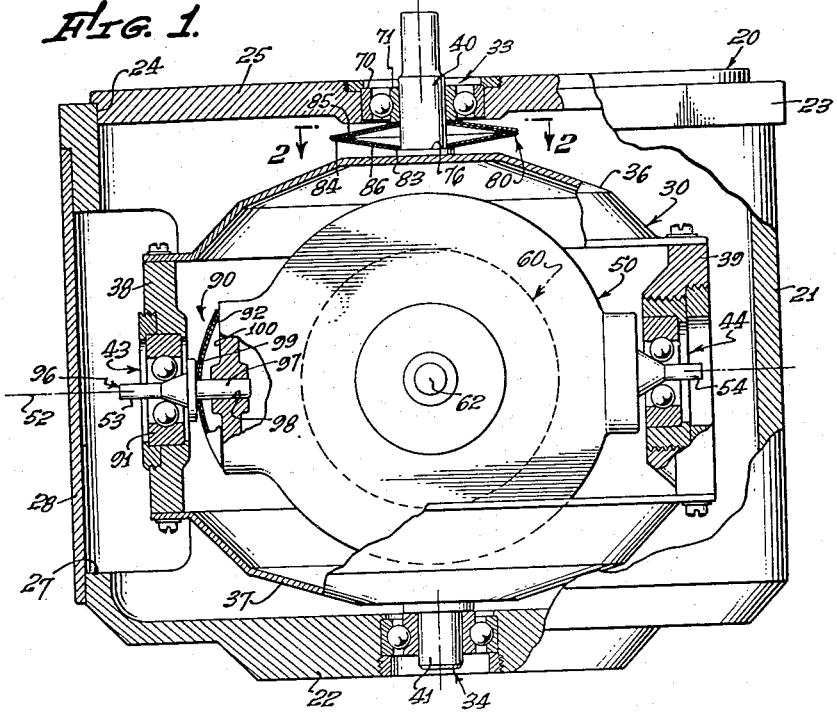
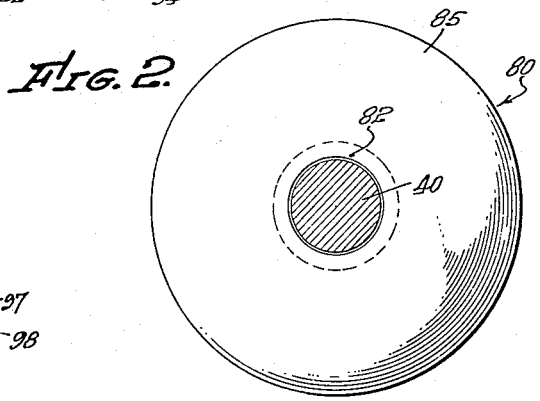
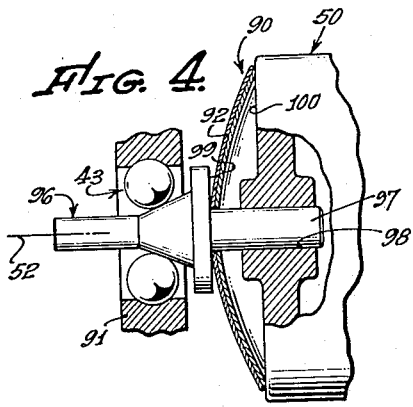
CHARLES F. SARDOU, JR.
INVENTOR.
BY
Barkelew & Scantlebury
ATTORNEYS.

United States Patent Office 2,727,796
Patented Dec. 20, 1955

2,727,796

TEMPERATURE COMPENSATION OF SHAFT END PLAY AND THE LIKE

Charles F. Sardou, Jr., Downey, Calif., assignor to G. M. Giannini & Co., Inc., Pasadena, Calif., a corporation of New York Application January 11, 1955, Serial No. 481,091

2 Claims. (Cl. 308—178)

This invention is concerned with means for compensating dimensional variations in physical structures that are subject to a wide range of temperature. Such structural variations may result from differences in the coefficients of temperature expansion in different parts of the structure, or to the exposure of different parts of the structure to different temperatures.

The invention is particularly useful for compensating variations in end play of bearings. Many types of instruments include a shaft or other member journaled on axially spaced bearings for which it is desirable to maintain minimum end play, or to maintain a predetermined definite amount of end play, in spite of wide temperature fluctuations. Such control has previously been accomplished by use of substantially the same materials for both of the relatively rotatable members. However, it may be desirable to use materials having widely different temperature coefficients of expansion. For example, it may be desired to journal a steel shaft in a frame of aluminum.

The present invention permits such freedom in design by providing remarkably simple and economical means for compensating for differential expansion of different parts of a structure. For example, the axial spacing between bearings on a shaft may be caused to change with temperature in a manner that is quite different from the normal shaft expansion and that corresponds closely to the normal axial expansion of the frame.

In accordance with the invention, that is accomplished by mounting one of the bearing elements in axially movable relation to the shaft, and controlling that movement by means of one or more bimetal elements of annular form coaxial with the shaft and interposed between the bearing and an axially facing shoulder on the shaft. The radially inner portion of the bimetallic element preferably has one face in definite axial relation to the bearing, the radially outer portion of the element being maintained in definite axial relation to the shoulder on the shaft. That latter relation may be maintained by direct contact, or by means of an interposed spacing element.

In preferred form of the invention, that spacing element comprises a second bimetallic element of annular form, the two bimetallic elements being oppositely disposed and being in direct contact, or otherwise definitely spaced axially, adjacent their outer peripheries. The inner portions of the two elements then directly engage, or are otherwise positively related to, the bearing and the shaft shoulder, respectively. Both bimetallic elements are preferably slightly conical in form, and have the same arrangement of the two metals with respect to the cone, so that the conical angles of both change in the same direction with changes in temperature. The conical elements are then arranged with their inner faces adjacent and in direct contact only adjacent their outer peripheries.

The invention is particularly useful in connection with members mutually journaled on axially spaced bearings for which friction must be held to a minimum while maintaining accurate adjustment of the bearing end play. That problem is especially severe in the gimbal bearings of a gyroscope. That is particularly true in gyros intended for aircraft use, which must combine extreme accuracy with minimum weight, and which are often subject to wide variations of temperature. The materials otherwise most suitable for the outer frame, the gimbal and the rotor housing of such gyros may have very different temperature coefficients. Moreover, the rotor may regularly reach a higher temperature than the outer frame, tending further to disturb the end play adjustment. By providing direct mechanical compensation for such temperature effects in gyro gimbal bearings, the present invention improves the performance of the instrument both by directly maintaining proper bearing end play and by permitting greater freedom than was previously available in the selection of materials for the various parts of the structure.

A full understanding of the invention and of its further objects and advantages will be had from the following description of an illustrative embodiment, of which description the accompanying drawings form a part. However, many changes and modifications may be made in carrying out the invention, and the particulars of the present embodiment are intended only as illustration, and not as a limitation upon the scope of the invention, which is described in the appended claims.

In the drawings:

Fig. 1 is a section representing an illustrative embodiment of the invention in a gyroscope gimbal;

Fig. 2 is a section on line 2—2 of Fig. 1 at enlarged scale;

Fig. 3 is a fragmentary section, showing a portion of Fig. 1 at enlarged scale; and Fig. 4 is a fragmentary section, showing another portion of Fig. 1 at enlarged scale.

The drawings represent a gyroscope in which the invention is illustratively embodied. For clarity of description, but without intending any limitation on the invention, that gyroscope will be considered as having the normal orientation shown in Fig. 1, which would be appropriate, for example, in a gyroscope for indicating roll and yaw of an aircraft. The relative dimensions of certain parts are somewhat exaggerated for clarity of illustration.

A fixed housing is indicated generally at 20, comprising a vertical cylindrical shell 21 with its lower end closed by the wall 22. The upper end of housing 20 carries a square external mounting flange 23, and has a circular opening 24 in which a mounting plate 25 is removably fixed, as by screws not shown. An access aperture 27 is shown in cylindrical wall 21, and may be closed by a closure plate indicated at 28.

The outer gimbal of the gyroscope, indicated generally by the numeral 30 is journaled on a vertical outer gimbal axis 32 on upper and lower journal bearings 33 and 34, mounted coaxially of the housing in mounting plate 25 and end wall 22, respectively. Outer gimbal 30 may be of any suitable structural form. As shown, it comprises typically upper and lower generally circular frame members 36 and 37, which are somewhat dished outward in such a way that they approximate polar zones of a spherical shell. Frame members 36 and 37 are peripherally flanged and are rigidly connected in axially spaced relation by two generally rectangular end plates 38 and 39. Pivot studs 40 and 41 are rigidly mounted coaxially on the outer faces of frame members 36 and 37, respectively, and are received by journal bearings 33 and 34. Outer gimbal 30 is thereby mounted in housing 20 for rotation about outer gimbal axis 32 throughout 360°. End plates 38 and 39 are centrally apertured to receive the respective journal bearings 43 and 44 for the inner gimbal.

The inner gimbal, indicated generally at 50, comprises a substantially closed housing, which may be of generally spherical form, and which carries two oppositely positioned radial pivot studs 53 and 54. Those pivot studs, which define an inner gimbal axis 52, are received, respectively, in journal bearings 43 and 44. The latter bearings define the position of inner gimbal axis 52 with respect to outer gimbal 30, inner and outer gimbal axes 52 and 32 intersecting perpendicularly and establishing a gimbal axis plane, which is the plane of the section in Fig. 1. Inner gimbal 50 is rotatable throughout 360° about axis 52.

The gyroscope rotor, indicated schematically at 60 in Fig. 1, is journaled with respect to inner gimbal 50 on a rotor axis 62, which is normal to the gimbal axis plane (normal to the paper in Fig. 1) at the intersection of the two gimbal axes. The rotor may be driven in any suitable manner, not specifically shown, for example by electric power brought in through slip rings of conventional type which accommodate gimbal rotation. Indicating or control means may be provided, responsive to gimbal rotation about one or both of the described gimbal axes. Such indicating or control means may be of many different types, depending upon the service for which the gyroscope is intended, but are not in themselves a part of the present invention and have been omitted in the drawings for clarity of illustration. Each gimbal, together with all its carried structure, is preferably accurately balanced with respect to its gimbal axis, balancing means for that purpose being omitted in the present drawings for clarity of illustration.

In accordance with the present invention, frame 20, outer gimbal 30 and inner gimbal or rotor housing 50 may each be constructed of the material or combination of materials most suitable for the purpose, without special regard for the relation between their respective coefficients of temperature expansion. That freedom in selection of materials typically permits significant improvement in overall performance of the instrument. Any resulting differential temperature expansion, which would otherwise disturb the end play adjustment of one or both pairs of gimbal bearings, is compensated by means now to be described.

In compensating each set of journal bearings, separate compensating means may be provided in association with each bearing of the set. However, it is ordinarily sufficient to provide compensating means at only one of the bearings, as illustratively shown. Thus, in the case of the outer gimbal bearings, which may be considered as journaling a shaft member 30 or a frame member 20, lower bearing 34 is shown as a conventionally mounted ball bearing, which defines a definite axial relation between pivot stud 41 and lower frame plate 22.

Upper bearing 33 typically comprises outer and inner races 70 and 71, respectively. As shown, outer race 70 is axially fixed with respect to frame plate 25 by any suitable means, which may provide for axial adjustment in any conventional manner. Inner race 71 is axially slidable on pivot stud 40 under control of temperature responsive means 80. Those means, as shown, comprise a pair of oppositely disposed annular bimetallic members 85 and 86, which surround pivot stud 40 between bearing race 71 and an axially facing shoulder 76 formed on the stud. That shoulder provides positive axial location of the radially inner portion 83 of bimetallic element 86. The radially inner portion 82 of element 85 is similarly related axially to bearing race 71. In the present instance, those relations are both established by direct mutual contact of the parts, but spacing means may be interposed if desired. The two bimetallic elements are mutually related axially at their outer peripheral portions, which, as shown, are in direct contact at 84. Each of the bimetallic elements may be considered in certain respects as a spacing element acting between the outer peripheral portion of the other and one of the mutually journaled members.

The two bimetallic elements are preferably of slightly conical form, and may be slightly bowed as seen in section, their conically inner faces being opposed. That conical form has the advantage of limiting the mutual contact between the two elements to their outer peripheral portion without requiring any special spacing means between the elements. At the same time, it causes bimetallic element 85, for example, to engage only the inner race of bearing 33 and to clear outer race 72, again without requiring any special spacing means. Ordinarily a conical angle close to 180°, corresponding to a nearly flat cone, is sufficient for those purposes. The conical form also has the important advantage of greatly increasing the effective mechanical rigidity of the bimetallic washer at any given temperature without equivalent reduction of the degree of temperature deformation.

As indicated in the drawings, both bimetallic elements preferably have the same arrangement of their two metals with respect to the conical angle, similar metals of the two elements thus being adjacent. With that arrangement, any temperature change produces a change of the same sign in the conical angles of the two elements, and the compensating action is cumulative.

In operation, a given change in ambient temperature typically causes unequal changes in the axial dimensions of frame 20 and of outer gimbal 30. Since those two members may be considered to be mutually fixed axially at lower bearing 34, the differential expansion causes relative axial movement at the upper bearing of outer race 71 with respect to pivot stud 40. The temperature change also causes distortion of bimetallic elements 85 and 86, tending to move inner bearing race 71 away from shoulder 76 with increasing conical angle of those elements; and permitting bearing race 71 to slide along pivot stud 40 toward shoulder 76 with decreasing conical angle of the bimetallic elements. The stiffness of those elements is so selected, with regard to the metals of which they are formed, that the resulting movement of inner race 71 with respect to pivot stud 40 is substantially equal to the axial movement, already described, of outer race 70 with respect to that stud; the arrangement of metals in the bimetallic element being such that those movements are in the same direction. The inner and outer bearing races then maintain substantially uniform axial relation, moving together axially of pivot stud 40.

For example, if frame 20 is aluminum and gimbal 30 is steel, the axial expansion of the frame in a typical gyroscope for aircraft use may exceed that of the gimbal by about 0.003 inch for each 50° C. increase of temperature. It has been found that such a dimensional change can be effectively compensated, and the bearing end play adjustment preserved, by a pair of bimetallic elements of the type described, comprising typical commercially available alloys and having, for example, inner and outer radii of 0.250 and 0.500 inch, respectively, total thickness of 0.040 inch, and conical angle of about 175°.

Fig. 1 further illustrates at 90 an embodiment of the invention which utilizes a single annular bimetallic element 92 coaxial with inner gimbal bearing 43. As shown, the bearing comprises an outer bearing member 91 in fixed axial relation to end plate 38 of gimbal 30, and an inner member which comprises a pin 96. Pin 96 includes a base portion 97, slidable in a fitting axial bore 98 in rotor housing 50, and an outer portion 53 which forms the bearing spindle. Inward movement of pin 96 in bore 98 is limited by interposition of bimetallic element 92 between the inwardly facing axial face formed at 99 on pin 96 and the outwardly facing axial face 100 of rotor housing 50. As shown, shoulder 99 directly contacts one face of the bimetallic element 92 near its radially inner periphery, while housing shoulder 100 directly contacts the other face of element 92 near its outer periphery. The bimetallic element thus acts as a temperature responsive spacing means, shifting the axial position of pin 96 with respect to housing 50 in such a way as to maintain a substantially fixed axial relation between the pin and outer bearing member 91.

I claim:

1. Means for compensating temperature variations in the end play of a shaft bearing, comprising structure forming opposing axially facing surfaces on the shaft and on the bearing, respectively, two bimetallic washers in mutually opposed coaxial relation, with their adjacent faces effectively in contact only adjacent their outer peripheries, the said surfaces of the shaft and bearing effectively engaging the other faces of the respective washers only adjacent the inner peripheries thereof.

2. Means for compensating temperature variations in the end play of a shaft bearing, comprising structure forming opposing axially facing surfaces on the shaft and on the bearing, respectively, two slightly conical bimetallic washers in mutually opposed coaxial relation, their adjacent faces being mutually spaced at their inner peripheries and being in direct mutual contact at their outer peripheries, the said surfaces of the shaft and bearing directly engaging the other faces of the respective washers only adjacent the inner peripheries thereof.

References Cited in the file of this patent

UNITED STATES PATENTS

| | | |
|---|---|---|
| 2,189,375 | Sylvander | Feb. 6, 1940 |
| 2,352,469 | Carlson | June 27, 1944 |